(12) United States Patent
Tanabe

(10) Patent No.: US 10,203,686 B2
(45) Date of Patent: Feb. 12, 2019

(54) OPERATION MANAGEMENT SYSTEM FOR DIRECTLY DISPLAYING WORK INSTRUCTION BASED ON OPERATION MANAGEMENT INFORMATION ON MACHINE TOOL

(71) Applicant: FANUC Corporation, Yamanashi (JP)

(72) Inventor: Masaki Tanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 208 days.

(21) Appl. No.: 15/371,498

(22) Filed: Dec. 7, 2016

(65) Prior Publication Data
US 2017/0160718 A1    Jun. 8, 2017

(30) Foreign Application Priority Data
Dec. 8, 2015    (JP) .................. 2015-239196

(51) Int. Cl.
*G05B 19/402* (2006.01)
*G05B 19/418* (2006.01)

(52) U.S. Cl.
CPC ....... *G05B 19/402* (2013.01); *G05B 19/4188* (2013.01); *G05B 2219/37407* (2013.01); *Y02P 90/14* (2015.11); *Y02P 90/18* (2015.11); *Y02P 90/20* (2015.11); *Y02P 90/205* (2015.11); *Y02P 90/24* (2015.11)

(58) Field of Classification Search
None
See application file for complete search history.

(56) References Cited

U.S. PATENT DOCUMENTS

2006/0028672 A1    2/2006  Abiko

FOREIGN PATENT DOCUMENTS

| CN | 1734443 A | 2/2006 |
|---|---|---|
| JP | S61214956 A | 9/1986 |
| JP | H0487762 A | 3/1992 |
| JP | H05289733 A | 11/1993 |
| JP | 2002-343154 A | 11/2002 |
| JP | 2002373015 A | 12/2002 |
| WO | 2014/038082 A1 | 3/2014 |

OTHER PUBLICATIONS

Office Action in JP Application No. 2015-239196, dated Oct. 24, 2017, 4pp.

*Primary Examiner* — Whitney Moore
(74) *Attorney, Agent, or Firm* — Hauptman Ham, LLP

(57) ABSTRACT

An operation management system is constituted by a management server and a plurality of machine tools connected to each other via a network. The management server manages the operation status of each of the machine tools and the work schedule of an operator conducting work with the machine tools, specifies a machine tool to be used by the operator in next work based on notifications from the machine tools and the work schedule of the operator, and instructs each of the machine tools to produce a display for guiding the operator to the specified machine tool.

4 Claims, 6 Drawing Sheets

FIG. 2

OPERATOR A

| PROCESS NUMBER | MACHINE TOOL TO BE USED | SCHEDULED START TIME | SCHEDULED END TIME | WORK TIME | START TIME | END TIME | PROGRESS | ⋮ |
|---|---|---|---|---|---|---|---|---|
| A1 | MACHINE TOOL a (ID=1) | 8:30 | 8:50 | 20 MINUTES | 8:31 | 8:53 | COMPLETE | ⋮ |
| A2 | MACHINE TOOL b (ID=2) | 8:55 | 9:25 | 30 MINUTES | 8:55 | | WORKING | ⋮ |
| A3 | MACHINE TOOL c (ID=3) | 9:30 | 9:45 | 15 MINUTES | | | NOT WORKING | ⋮ |
| ⋮ | ⋮ | ⋮ | ⋮ | ⋮ | ⋮ | ⋮ | ⋮ | ⋮ |

OPERATOR B

| PROCESS NUMBER | MACHINE TOOL TO BE USED | SCHEDULED START TIME | SCHEDULED END TIME | WORK TIME | START TIME | END TIME | PROGRESS | ⋮ |
|---|---|---|---|---|---|---|---|---|
| B1 | MACHINE TOOL n (ID=14) | 8:30 | 8:45 | 15 MINUTES | 8:28 | 8:43 | COMPLETE | ⋮ |
| B2 | MACHINE TOOL o (ID=15) | 8:50 | 9:10 | 20 MINUTES | 8:48 | | WORKING | ⋮ |
| B3 | MACHINE TOOL p (ID=16) | 9:15 | 9:45 | 30 MINUTES | | | NOT WORKING | ⋮ |
| ⋮ | ⋮ | ⋮ | ⋮ | ⋮ | ⋮ | ⋮ | ⋮ | ⋮ |

| ID | NAME OF WORKING MACHINE | POSITION INFORMATION | DIRECTION INFORMATION | ... |
|---|---|---|---|---|
| 1 | MACHINE TOOL a | AREA A, X=1, Y=12 | Y+ | ... |
| 2 | MACHINE TOOL b | AREA A, X=8, Y=12 | Y+ | ... |
| 3 | MACHINE TOOL c | AREA A, X=15, Y=12 | Y- | ... |
| ⋮ | ⋮ | ⋮ | | ... |

OPERATION MANAGEMENT SYSTEM FOR DIRECTLY DISPLAYING WORK INSTRUCTION BASED ON OPERATION MANAGEMENT INFORMATION ON MACHINE TOOL

RELATED APPLICATIONS

The present application claims priority to Japanese Patent Application Number 2015-239196, filed Dec. 8, 2015, the disclosure of which is hereby incorporated by reference herein in its entirety.

BACKGROUND OF THE INVENTION

1. Field of the Invention

The present invention relates to an operation management system and, in particular, to an operation management system having the function of directly displaying, on a machine tool, a work instruction based on operation management information.

2. Description of the Related Art

In general, machine tools operating in a factory are connected to a network to be managed. As a system operating in a factory, there are, for example, an operation monitoring system for monitoring the operation status of the whole factory based on information on machine tools including the operation statuses of the machine tools connected to a network, and an operation management system for determining the operation schedule of machine tools based on information on production plans, manpower, and facilities. The operation monitoring system and the operation management system are not independent of each other, and the operation management system adjusts a schedule in real time based on information collected by the operation monitoring system.

In addition, with the advanced automation of machine tools, an operator has no need to stay in front of the machine tools during the machining of the machine tools. Therefore, in a factory, an operator may concurrently perform various work processes (such as the replacement of workpieces and an instruction to start driving) with a plurality of machine tools. In such a situation, an operation management system may manage not only the operation schedule of machine tools but also a schedule for each operator as to what order the operator operates a plurality of machine tools.

For example, Japanese Patent Application Laid-open No. 2002-373015 discloses a system for correcting an operation schedule in real time based on information obtained from an operation status to notify an operator of the order of conducting setup work.

In a situation in which various kinds of products are produced in small amounts, an optimum schedule for the operation of machine tools changes not only with daily production contents but also with sudden failures in facilities or delay in operator's work. Accordingly, in order to conduct work under an appropriate schedule, an operator has need to pay attention to a change in the schedule at all times and periodically confirm the schedule.

On the other hand, in a situation in which the same kind of products are produced in large amounts, an operator conducts work under the same schedule day by day. In such a situation, the operator does not feel much need to confirm a schedule on a daily basis. Therefore, the operator is less likely to confirm a schedule or confirms the schedule as formality work. As a result, when a schedule changes, the operator does not notice the change and thus is not able to conduct work under an optimum schedule.

According to the technology described in Japanese Patent Application Laid-open No. 2002-373015, a work order is displayed in list form on a machine tool that is being operated by an operator and an information terminal adjacent to the machine tool. However, an operator is not able to intuitively grasp display contents by such a list-form display and has a need to understand the location and the name of a machine concerned. In addition, when an operator conducts work under the same schedule day by day, he/she assumes that no change occurs in a schedule displayed in list form and thus is likely to omit the confirmation of the schedule. Accordingly, there is a need to present information that is more concise, easily understandable, and does not cause the omission of confirmation to an operator working on site.

SUMMARY OF THE INVENTION

In view of the above problems, it is an object of the present invention to provide an operation management system that allows an operator to intuitively understand a machine tool to be next operated and gives a work instruction preventing the omission of confirmation to the operator through the display devices of machine tools arranged side by side in a factory.

An operation management system according to an embodiment of the present invention includes: a plurality of machine tools that operates based on an operation by an operator; a management server; and a network via which the plurality of machine tools and the management server are connected to each other. The management server includes a schedule information storage unit that stores schedule information representing information on a work schedule of the operator conducting work with the machine tools, a notification analysis unit that analyzes notifications transmitted from the machine tools, a schedule management unit that specifies a machine tool to be used by the operator in a next work process among the plurality of machine tools based on analysis results of the notifications analyzed by the notification analysis unit and the schedule information, and a guide information generation unit that generates guide information for guiding the operator to the machine tool specified by the schedule management unit, and transmits the generated guide information to one or more machine tools that are under the charge of the operator among the plurality of machine tools. Each of the plurality of machine tools includes a guide information analysis unit that analyzes the guide information transmitted from the management server to generate information for guiding the operator to the machine tool to be used in the next work process, a display unit that displays the information for guiding the operator to the machine tool to be used in the next work process, and a notification generation unit that monitors the operation by the operator and transmits a notification representing a status of the work by the operator to the management server.

The guide information analysis unit may be configured such that, when an analysis result of the guide information shows that the machine tool to be used by the operator in the next work process is a machine tool embedded with the guide information analysis unit, the guide information analysis unit generates information indicating that the machine tool embedded with the guide information analysis unit is to be used by the operator in the next work process, as the information for guiding the operator to the machine tool to be used in the next work process, and when the analysis result of the guide information shows that the machine tool to be used by the operator in the next work process is a machine tool other than the machine tool embedded with the guide information analysis unit, the guide information analysis unit generates an instruction to switch off the display unit or reduce brightness of the display unit as the information for guiding the operator to the machine tool to be used in the next work process.

The guide information analysis unit may be configured such that, when an analysis result of the guide information shows that the machine tool to be used by the operator in the next work process is a machine tool embedded with the guide information analysis unit, the guide information analysis unit generates information indicating that the machine tool embedded with the guide information analysis unit is to be used by the operator in the next work process, as the information for guiding the operator to the machine tool to be used in the next work process, and when the analysis result of the guide information shows that the machine tool to be used by the operator in the next work process is a machine tool other than the machine tool embedded with the guide information analysis unit, the guide information analysis unit generates information representing a direction of the machine tool to be used by the operator in the next work process when seen from the machine tool embedded with the guide information analysis unit, as the information for guiding the operator to the machine tool to be used in the next work process.

The display unit may be configured so as not to display the information for guiding the operator to the machine tool to be used in the next work process when a machine tool embedded with the display unit is being used by the operator.

According to an embodiment of the present invention, it is possible for an operator to intuitively grasp a machine tool to be next operated and move to a target machine tool without hesitation. In addition, in each of machine tools other than the target machine tool, a screen indicating that the machine tool is not a target machine tool is displayed, and it is therefore possible to prevent an operator from misunderstanding a schedule or operating a wrong machine tool without confirmation.

BRIEF DESCRIPTION OF THE DRAWINGS

The above and other objects and features of the present invention will become apparent from the descriptions of the following embodiments with reference to the accompanying drawings in which;

FIG. 2 is a diagram showing an example of work process schedule information for each operator stored in a schedule information storage unit in the operation management system of FIG. 1;

DETAILED DESCRIPTION OF THE PREFERRED EMBODIMENTS

Under circumstances in which an operator is in charge of a plurality of machine tools and conducts work while moving between the machine tools, an operation management system according to the present invention manages a schedule for each operator. In the operation management system, a machine tool to be worked on next is indicated to an operator through the display devices of the machine tools.

When an operator starts or ends work on a machine tool, the machine tool transmits a work start notification or a work end notification to the operation management system. After receiving such a notification, the operation management system determines a machine tool to be worked on next according to schedule information on the operator stored in the operation management system. In order to indicate the determined machine tool, the operation management system transmits information for specifying the determined machine tool to a plurality of machine tools managed by the operator. In the machine tool to be worked on next among the plurality of machine tools, the fact that the machine tool is to be worked on next is displayed on its display device in a manner such that the operator can easily understand. The remaining machine tools switch off their display devices, or indicate the relative positional relationship between the machine tools and the machine tool to be worked on next with arrows. Since the information for specifying the machine tool to be worked on next among all the machine tools managed by the operator is displayed on each of the display devices of the machine tools, the operator is able to easily and intuitively grasp the machine tool concerned.

Figure 1:
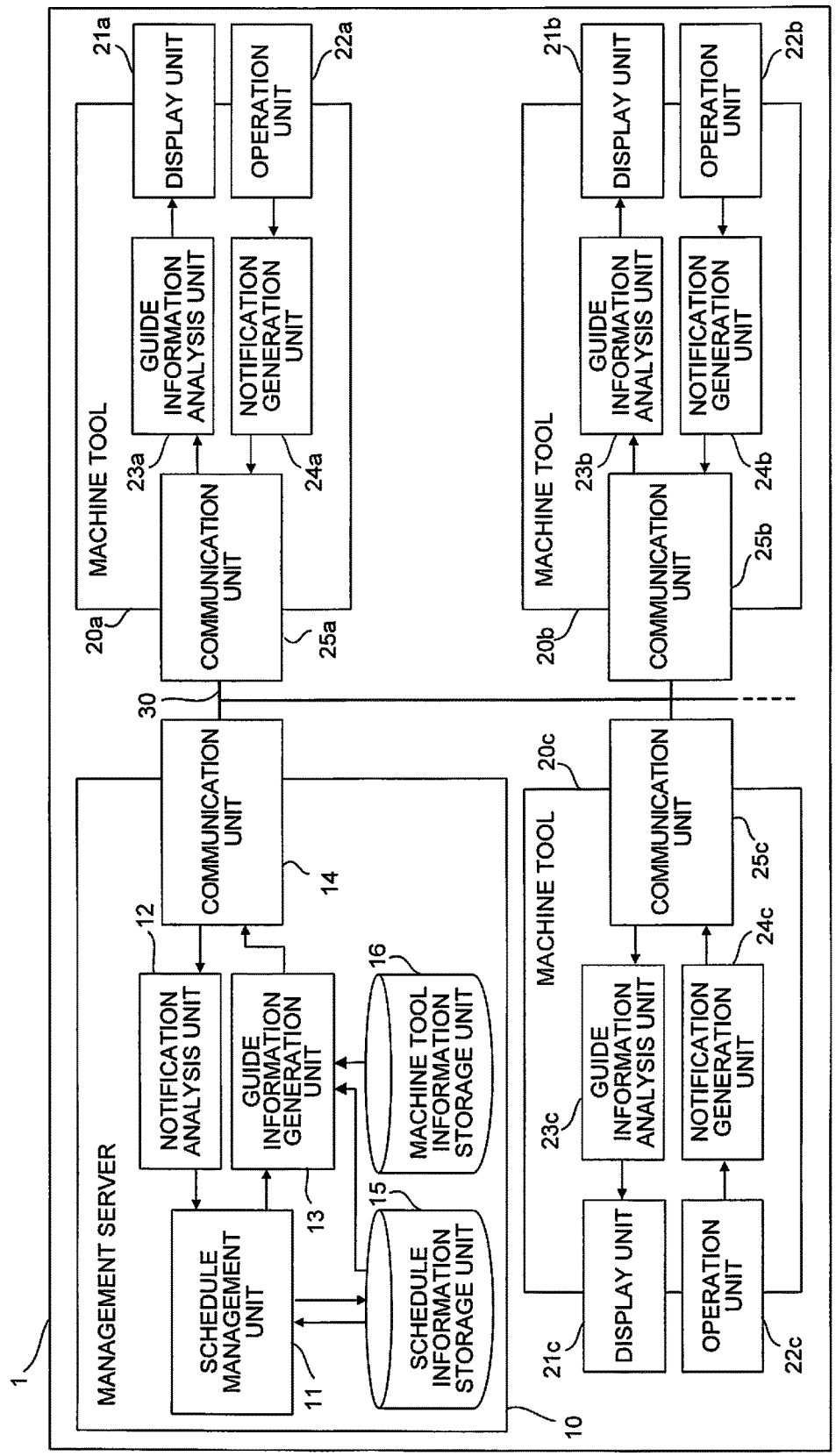
FIG. 1 is a schematic block diagram of an operation management system according to an embodiment of the present invention.

FIG. 1 is a schematic block diagram of the operation management system according to the embodiment of the present invention.

An operation management system 1 is constituted by a management server 10 and a plurality of machine tools 20a, 20b, and 20c (three machine tools in the example of FIG. 1) connected to the management server 10 via a network 30 and managed by the management server 10. Note that the number of machine tools managed by the management server 10 is not particularly limited.

On the management server 10, operation management software operates. The management server 10 has a general schedule management function and grasps a schedule for machine tools 20 of the whole factory. In addition, the management server 10 manages a schedule for each operator, and manages the machine tools 20a, 20b, 20c that are under the charge of an operator as a group. In order to determine such schedules in the operation management system, a technology (a schedule management method for machine tools) disclosed in, for example, Japanese Patent Application Laid-open No. H05-289733, Japanese Patent Application Laid-open No. S61-214956, or the like may be used. In addition, in order to manage a schedule for an operator, a technology disclosed in, for example, Japanese Patent Application Laid-open No. 2002-373015 described above or Japanese Patent Application Laid-open No. H4-87762 may be used. However, the schedule management of the management server in the operation management system according to the embodiment is not limited to the above methods.

The management server 10 is provided with a schedule management unit 11 that manages a schedule for a work process for each operator who conducts work in a factory, a notification analysis unit 12 that analyzes a notification from each of the machine tools 20a, 20b, and 20c, a guide information generation unit 13 that generates guide information to be transmitted to each of the machine tools 20a, 20b, and 20c, a communication unit 14 that performs communication processing with each of the machine tools 20a, 20b, and 20c, a schedule information storage unit 15 that stores work process schedule information for each operator, and a machine tool information storage unit 16 that manages information on machine tools to be managed.

The notification analysis unit 12 receives a notification from each of the machine tools 20a, 20b, and 20c via the communication unit 14 and analyzes the received notification. Then, the notification analysis unit 12 outputs the ID and the notification content of each of the machine tools 20a, 20b, and 20c obtained as a result of the analysis to the schedule management unit 11.

When the notification content received from the notification analysis unit 12 represents a work end notification, the schedule management unit 11 searches for work process schedule information stored in the schedule information storage unit 15 based on the ID of one of the machine tools 20a, 20b, and 20c received from the notification analysis unit 12 and specifies work process schedule information on an operator using one of the machine tools 20a, 20b, and 20c corresponding to the ID. Then, the schedule management unit 11 extracts information on a work process to be next performed by the operator and a group of machine tools that are under the charge of the operator from the specified work process schedule information, and outputs the extracted information on the work process and the group of machine tools that are under the charge of the operator to the guide information generation unit 13 together with an instruction to display guide information.

On the other hand, when the notification content received from the notification analysis unit 12 represents a work start notification, the schedule management unit 11 searches for the work process schedule information stored in the schedule information storage unit 15 based on the ID of one of the machine tools 20a, 20b, and 20c received from the notification analysis unit 12 and specifies work process schedule information on the operator using one of the machine tools 20a, 20b, and 20c corresponding to the ID. Then, the schedule management unit 11 extracts a group of machine tools that are under the charge of the operator from the specified work process schedule information, and outputs the extracted group of machine tools that are under the charge of the operator to the guide information generation unit 13 together with an instruction to end the display of guide information.

FIG. 2 shows an example of the work process schedule information for each operator stored in the schedule information storage unit 15.

The work process schedule information stores information on a plurality of work processes to be performed by an operator so that the operator is able to grasp the order of performing the work processes. The information on each of the work processes includes at least the ID of a machine tool used in the work process and information on the progress of the work process. By referring to the work process schedule information, it is possible for each operator to grasp a group of machine tools that are under the charge of the operator, work progress including a work process being currently performed by the operator and a work process to be next performed, or the like. In the example of FIG. 2, an operator A is in charge of a machine tool a, a machine tool b, a machine tool c, etc., is currently performing a work process A2 with the machine tool b (ID=2), and is next to perform a work process A3 with the machine tool c (ID=3).

When receiving a work end notification from the machine tool b (ID=2) in a state in which the work process schedule information shown in FIG. 2 is stored in the schedule information storage unit 15, the schedule management unit 11 searches the schedule information storage unit 15 to extract the work process schedule information on the operator A including information on a work process with the machine tool of ID=2 and then searches for the information on "the work process of process number A2" representing information on the work process with the machine tool of ID=2 currently conducting the work from the extracted work process schedule information. Subsequently, the schedule management unit 11 extracts information on the "work process of process number A3" representing information on a work process to be next performed by the operator after the "work process of the process number A2" from the work process schedule information and outputs the extracted information to the guide information generation unit 13.

Note that the information on each of the work processes includes, as shown in FIG. 2, various information required for managing the work process such as the scheduled start/end time of the work process, the actual start/end time of the work process, and required time for the work process.

After receiving an instruction to display guide information from the schedule management unit 11, the guide information generation unit 13 generates guide information including at least the ID of a machine tool to be next worked on by an operator based on information on a work process received together with the display instruction and transmits the generated guide information to each of the machine tools 20a, 20b, and 20c belonging to a group of machine tools that are under the charge of the operator via the communication unit 14. On the other hand, when receiving an instruction to end guide information from the schedule management unit 11, the guide information generation unit 13 transmits guide information including the display end instruction to each of the machine tools 20a, 20b, and 20c belonging to a group of machine tools that are under the charge of the operator via the communication unit 14.

The guide information generation unit 13 generates guide information on some or all of the machine tools 20a, 20b, and 20c belonging to a group of machine tools that are under the charge of an operator. The guide information generation unit 13 may generate guide information common to the plurality of machine tools 20a, 20b, and 20c or may separately generate guide information for each of the machine tools 20a, 20b, and 20c.

The guide information generated by the guide information generation unit 13 may include information allowing an operator to grasp a machine tool to be used in a next work process, for example, information representing the direction of the machine tool 20 to be used by the operator in the next work process when seen from each of the machine tools 20a, 20b, and 20c (hereinafter, the plurality of machine tools will be collectively called the machine tools 20).

Figures 3, 4:
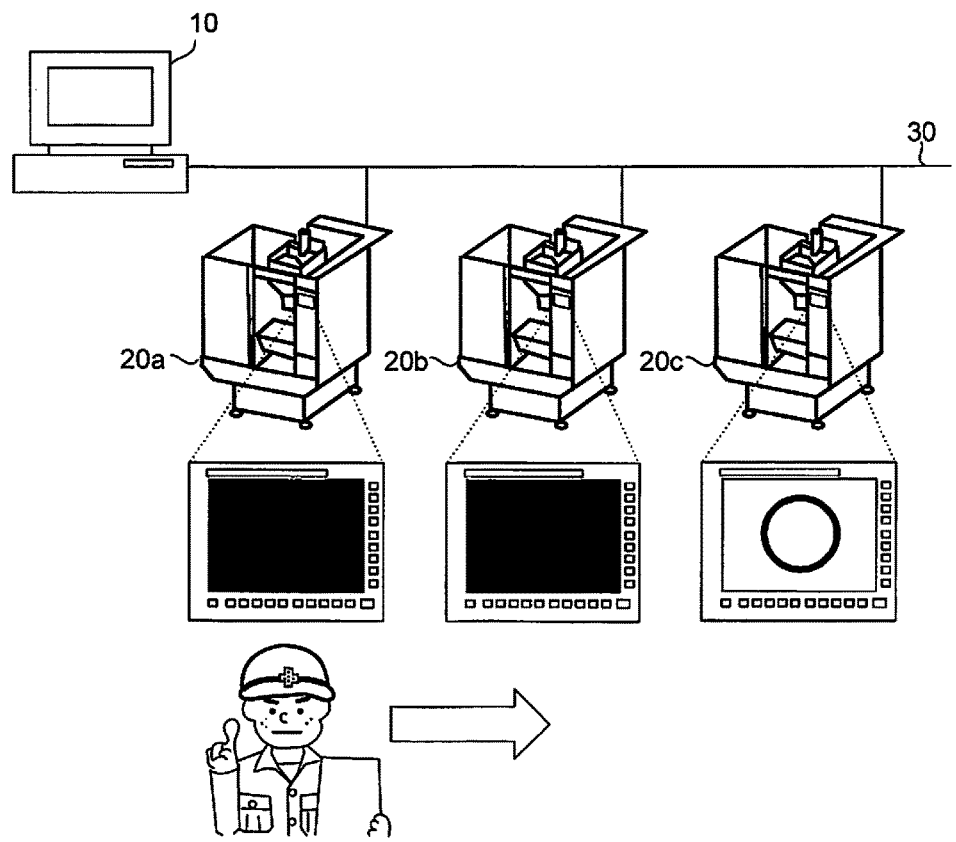
FIG. 3 is a diagram showing an example of information on machine tools stored in a machine tool information storage unit in the operation management system of FIG. 1.
FIG. 4 is a diagram showing a first example of an information display for guiding an operator in the operation management system of FIG. 1.

FIG. 3 shows an example of the information on the machine tools stored in the machine tool information storage unit 16.

The information on the machine tools 20 stored in the machine tool information storage unit 16 includes at least position information representing the positions of the machine tools 20 in a factory in which the machine tools 20 are arranged and direction information (such as a Y-axis positive direction and an X-axis negative direction) representing the directions of display units 21 of the machine tools 20 (the collective terms of a display unit 21a of the machine tool 20a, a display unit 21b of the machine tool 20b, a display unit 21c of the machine tool 20c, etc.). When the guide information generated by the guide information generation unit 13 includes information representing the direction of the machine tool 20 to be used by an operator in a next work process, the guide information generation unit 13 only needs to refer to the machine tool information storage unit 16 and generate the information representing the direction of the machine tool 20 to be used by the operator in the next work process when seen from each of the machine tools 20 based on the positional relationship between the respective machine tools 20 and the directions of the display units.

Each of the machine tools 20 (20a, 20b, 20c, or the like) is provided with the display unit 21 (21a, 21b, 21c, or the like) that produces a screen display to an operator, an operation unit 22 (22a, 22b, 22c, or the like) that accepts an operation by the operator, a guide information analysis unit 23 (23a, 23b, 23c, or the like) that analyzes guide information received from the management server 10, a notification generation unit 24 (24a, 24b, 24c, or the like) that generates a notification to the management server according to an operation through the operation unit 22, and a communication unit 25 (25a, 25b, 25c, or the like) that performs communication processing.

The display unit 21 displays the status of the machine tool 20 or guide information received from the management server 10 to an operator. The display unit 21 is constituted by a display device such as a liquid crystal display device and a touch panel. In addition, the operation unit 22 is a unit that accepts an input by an operator and is constituted by a series of switches, a keyboard, a mouse, a touch panel, or the like.

The guide information analysis unit 23 analyzes guide information received by the communication unit 25 and performs the control of information to be displayed on the display unit 21, the control of switching on/off the display unit 21, or the like according to an analyzed result, whereby the display unit 21 displays information for guiding an operator to a specific one of the machine tools 20. For example, when one of the machine tools 20 having received guide information is a machine tool to be used by an operator in a next work process, a circle may be displayed in red on the display unit 21 of the machine tool 20. On the other hand, when one of the machine tools 20 having received the guide information is not the machine tool to be used by the operator in the next work process, an arrow mark that guides the direction of the machine tool to be used by the operator in the next work process when seen from the machine tool 20 may be displayed on the display unit 21 of the machine tool 20. In addition, when one of the machine tools 20 having received guide information is the machine tool 20 to be used by an operator in a next work process, the display unit 21 of the machine tool may be switched on. On the other hand, when one of the machine tools 20 having received the guide information is not the machine tool to be used by the operator in the next work process, the display unit 21 of the machine tool may be switched off or its brightness may be reduced. As the display of the information for guiding an operator to the display unit 21 performed by the guide information analysis unit 23, any display method may be employed so long as the method allows the operator to intuitively grasp the machine tool 20 to be used in a next work process.

The notification generation unit 24 monitors an operation performed by an operator on the operation unit 22 to generate a notification corresponding the content of the operation and transmits the generated notification to the management server 10 via the communication unit 25. The notification generated by the notification generation unit 24 includes an ID for uniquely identifying the machine tool 20. When an operator explicitly performs an operation to generate a notification, the notification generation unit 24 may generate a notification corresponding to each operation. However, in a case in which work to be lastly conducted in the machine tool 20 is determined in advance, the notification generation unit 24 may generate a work end notification according to an operation, for example, when the machine tool 20 is instructed to start operating a program at the end of the work. As the generated notification, the notification generation unit 24 may generate a more specific notification corresponding to a content managed by the management server such as a power on/off notification and a maintenance start/end notification besides a work start notification and a work end notification.

Hereinafter, some examples of an information display for guiding an operator by the operation management system 1 according to the present invention with the above configuration will be shown.

(First Example of Information Display)

An example of the information display for guiding an operator is applied to a case in which the machine tools 20 managed by an operator fall within the visual range of the operator, and a description will be given of the example with reference to FIG. 4.

Guide information transmitted by the management server 10 to each of the machine tools 20 (20a, 20b, and 20c) may be common guide information included in the ID of the machine tool 20 to be used by an operator in a next work process. The machine tool 20 having been notified of the guide information compares its own ID with the ID of the machine tool 20 to be used by the operator in the next work process, and switches off the own display unit 21 or reduces the brightness of the own display unit 21 when the IDs do not match each other. On the other hand, when the ID of the machine tool 20 having been notified of the guide information and the ID of the machine tool 20 to be used by the operator in the next work process included in the guide information match each other, the display unit 21 of the machine tool 20 displays a sign indicating that the IDs match each other. As an example of the sign, a large circle may be displayed on the whole screen as shown in FIG. 4.

By looking around the surrounding machine tools 20 after generating a work end notification at one of the machine tools 20, the operator is able to grasp, at a glance, the machine tool 20 of which the display unit 21 is being switched on as the machine tool 20 to be worked on next. In addition, when there is a need to prohibit the operator from operating the other machine tools 20 on this occasion, the operator may not be made operable the machine tools 20 of which the display unit 21 is being switched off unless the machine tools 20 are authenticated, whereby the machine tools 20 operable by the operator may be limited to the machine tool 20*a* that has been operated at the last (the machine tool at which the operator has generated the work end notification) and the machine tool 20*c* determined by the management server to be used in the next work process. On the other hand, there is a likelihood that another operator performs an operation such as maintenance work on the machine tools 20 other than the machine tool 20 to be used in the next work process. Therefore, the machine tools 20 may switch off the display unit 21 or prohibit an operation by the operator on the condition that the operator has not performed a key operation on the machine tools 20 for a certain period of time.

(Second Example of Information Display)

Figure 5:
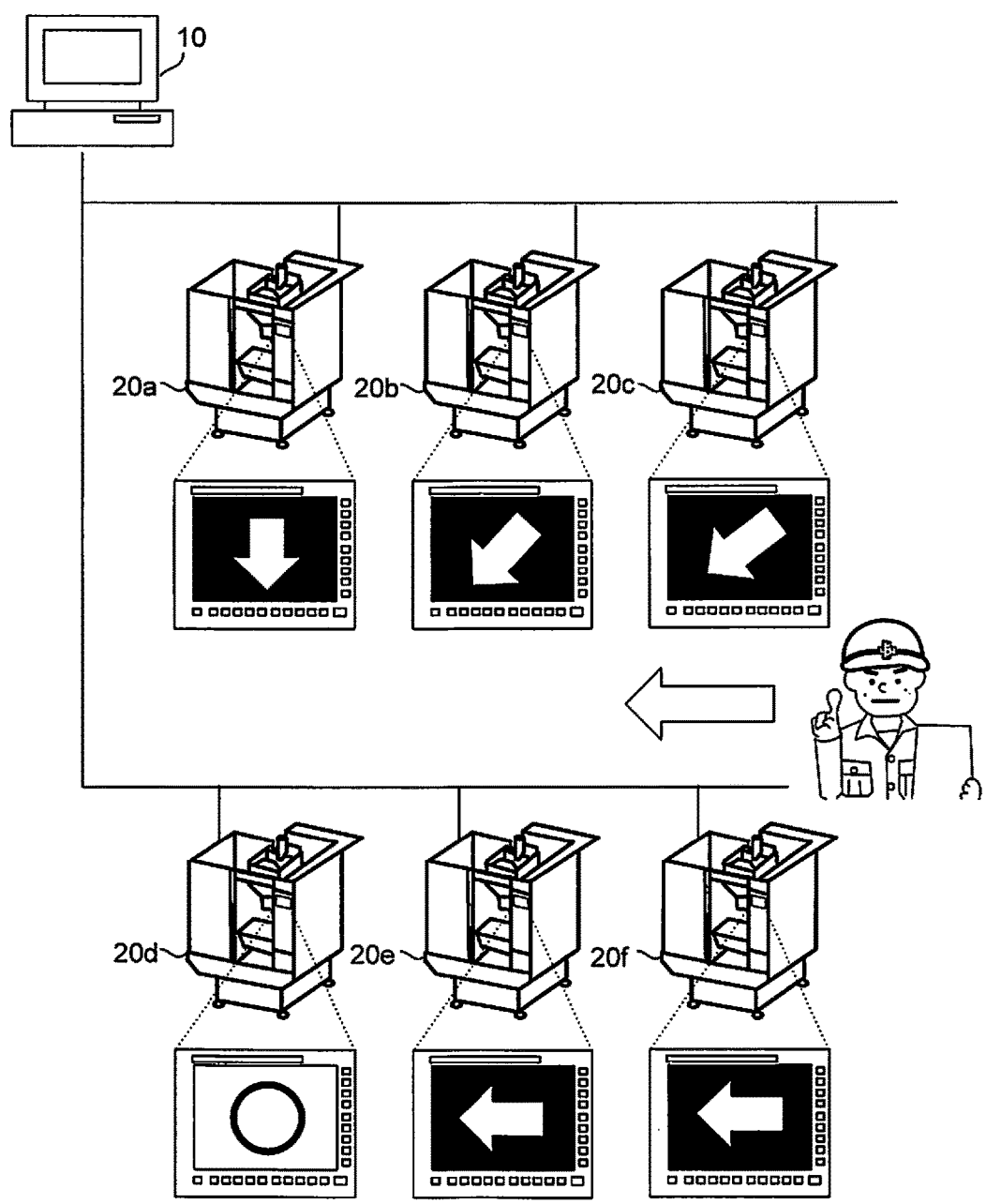
FIG. 5 is a diagram showing a second example of an information display for guiding an operator in the operation management system of FIG. 1.

An example of the information display for guiding an operator is applied to a case in which an operator is not able to visually inspect, at a glance, the machine tools 20 that are under the charge of the operator since the machine tools 20 managed by the operator are scattered, and a description will be given of the example with reference to FIG. 5.

Guide information transmitted by the management server 10 to each of the machine tools 20 (20*a*, 20*b*, and 20*c*) includes, besides the ID of the machine tool 20 to be used by an operator in a next work process, information representing the direction of the machine tool 20 to be used by the operator in the next work process when seen from each of the machine tools 20*a*, 20*b*, and 20*c*. Therefore, the guide information transmitted by the management server 10 may be generated as common guide information including information on all the machine tools 20*a*, 20*b*, and 20*c* or may be separately generated for each of the machine tools 20.

The information representing the direction of the machine tool 20 to be used by the operator in the next work process may be information representing four vertical and horizontal directions or eight directions including the four directions and oblique directions. At this time, the information displayed on the display unit 21 for guiding the operator is indicated as an arrow representing each direction of the display unit 21. For example, information representing an upper direction indicates a back side when seen from the display unit 21, and information representing a lower direction indicates a direction to a near side when seen from the display unit 21. The arrow may be displayed on a large scale on the display device since only the arrow is displayed as the information representing a direction, whereby the operator is able to easily grasp, while moving, a moving direction by seeing the display device of the machine tool 20 on his/her path.

The operator moves to the machine tool 20 to be used in the next work process along the direction of the arrow displayed on the display unit 21 of the machine tool 20 that the operator himself/herself has operated last, and the arrows displayed on the display units 21 of the adjacent machine tools 20. On the display unit 21 of the machine tool 20 to be used in the next work process, the same sign as that of the above first example (FIG. 4) of the information display is displayed. By seeing the sign, the operator is able to grasp, at a glance, the machine tool 20 to be used in the next work process. Note that when the machine tools 20 managed by a plurality of operators exist, an arrow mark or a circle color displayed is allocated for each of the operators. Thus, it is possible for an operator to prevent from misunderstanding an instruction to another operator.

(Third Example of Information Display)

Figure 6:
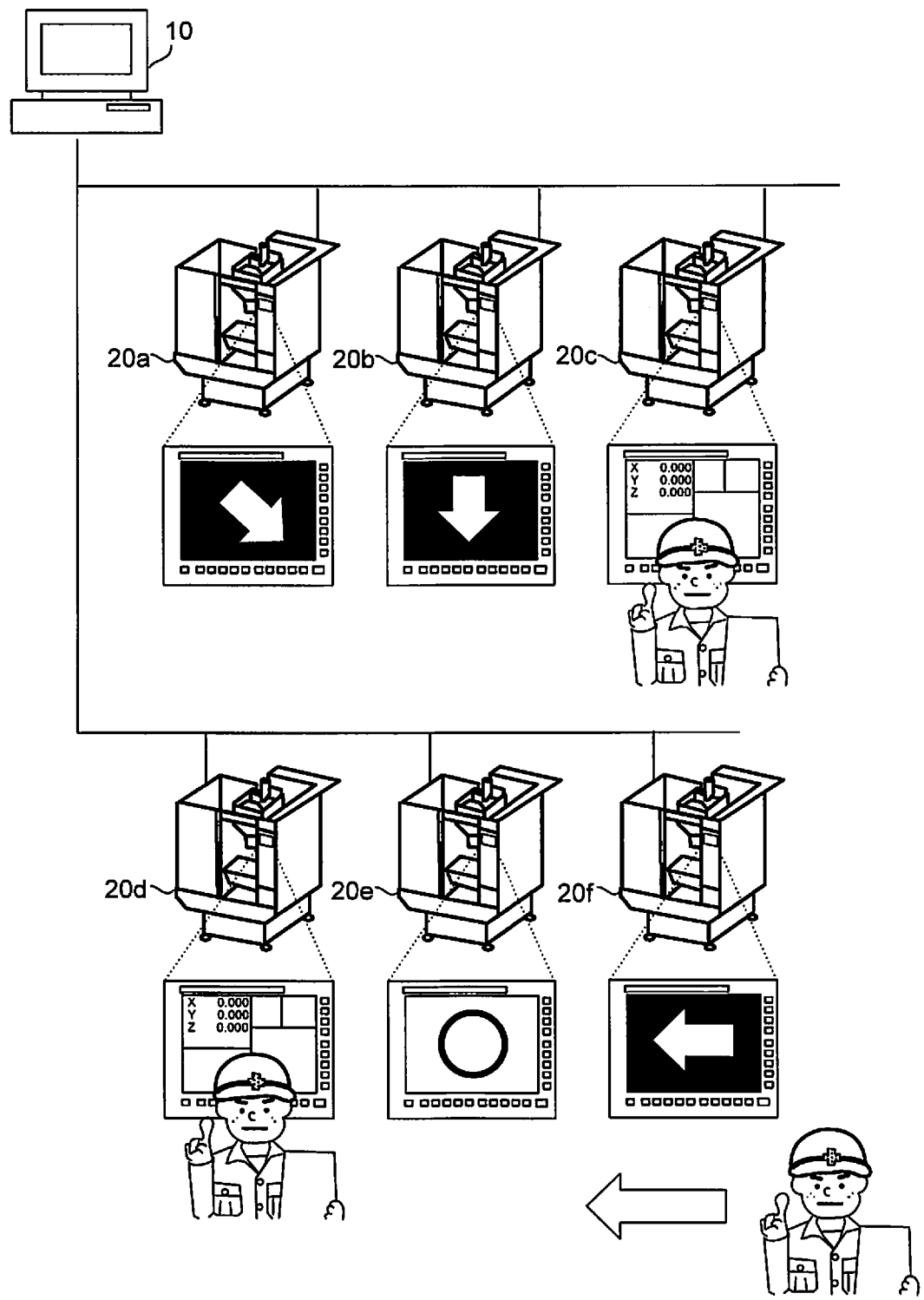
FIG. 6 is a diagram showing a third example of an information display for guiding an operator in the operation management system of FIG. 1.

An example of the information display for guiding an operator is applied to a case in which the plurality of machine tools 20 is managed by a plurality of operators, and a description will be given of the example with reference to FIG. 6.

Like the other examples of the information display described above, the machine tool 20 transmits a work start notification to the management server 10 when an operator arrives at the machine tool 20 to be used in a next work process according to information displayed on the display unit 21 of the machine tool 20 for guiding the operator and then starts working on the machine tool 20.

Instead of transmitting guide information including an instruction to end a display, the management server 10 transmits, when receiving the work start notification, guide information representing the machine tool 20 to be used in a work process next to the work process with the machine tool 20 having transmitted the work start notification. Then, among the machine tools 20 having received the guide information, only the machine tools 20 not being currently operated by the operator update the display of the information for guiding the operator according to the guide information.

On the other hand, although a work end notification is transmitted to the management server 10 when the operator ends work at the machine tool 20, the management server 10 does not transmit the guide information to the machine tool in this example even where the management server 10 receives the work end notification. As a result, on the machine tools 20 having not been operated by the operator, the latest information for guiding the operator and indicating the position of the machine tool 20 to be used in a next work process is continuously displayed. Accordingly, since information for guiding an operator to the machine tool 20 to be used in a next work process is displayed even while a first operator performs an operation, a second operator is able to move to the machine tool 20 to be worked on based on the information for guiding the operator. By repeatedly performing the above processing, it becomes possible for a plurality of operators to share and manage the plurality of machine tools 20. Note that as a method for displaying the information for guiding the operator in this example on the display unit 21 of the machine tool 20, the display method of the first example (FIG. 4) or the display method of the second example (FIG. 5) may be employed.

Figure 7:
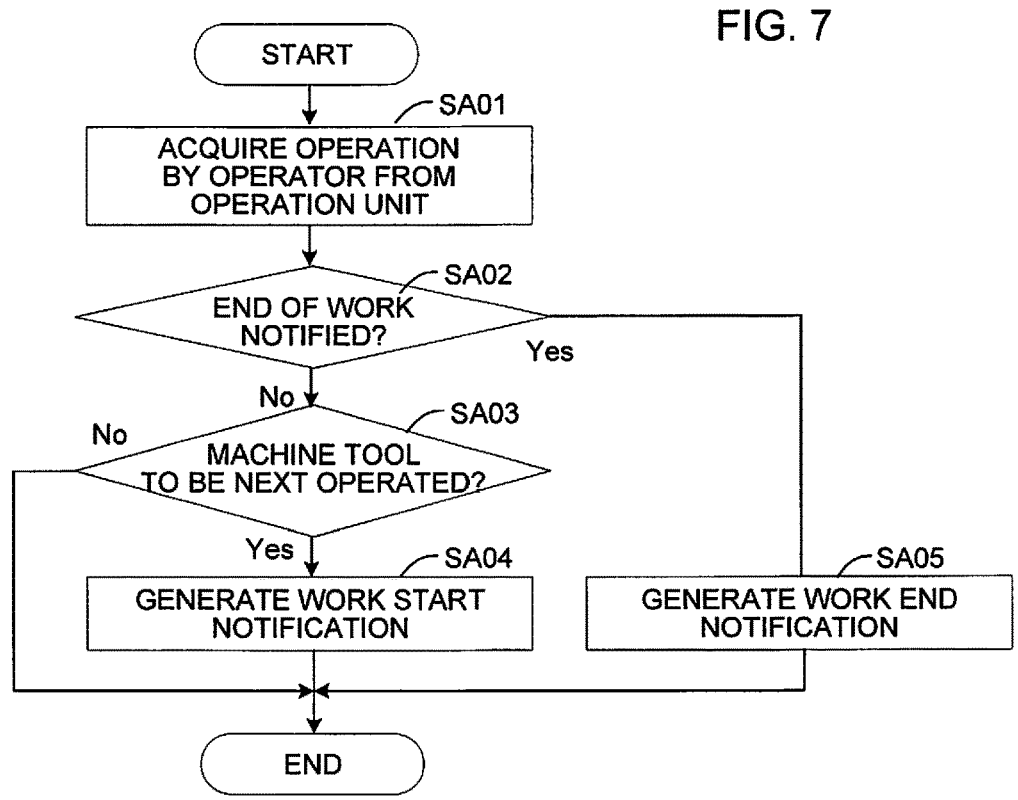
FIG. 7 is a flowchart showing the operation of a notification generation unit in the operation management system of FIG. 1.

FIG. 7 is a flowchart showing the operation of the notification generation unit 24. Hereinafter, a description will be given of each step.

(Step SA01) The notification generation unit 24 acquires an operation by an operator from the operation unit 22.

(Step SA02) The notification generation unit 24 determines whether the operation acquired in step SA01 represents the end of work in the machine tool 20. Processing proceeds to step SA05 when the operation represents the end of the work, or proceeds to step SA03 when the operation does not represent the end of the work.

(Step SA03) The notification generation unit 24 determines whether the operation acquired in step SA01 represents the start of the work in the machine tool 20. The processing proceeds to step SA04 when the operation represents the start of the work, or the processing ends when the operation does not represent the start of the work.

(Step SA04) The notification generation unit 24 generates a work start notification and transmits the generated work start notification to the management server 10 via the communication unit 25.

(Step SA05) The notification generation unit 24 generates a work end notification and transmits the generated work end notification to the management server 10 via the communication unit 25.

Figure 8:
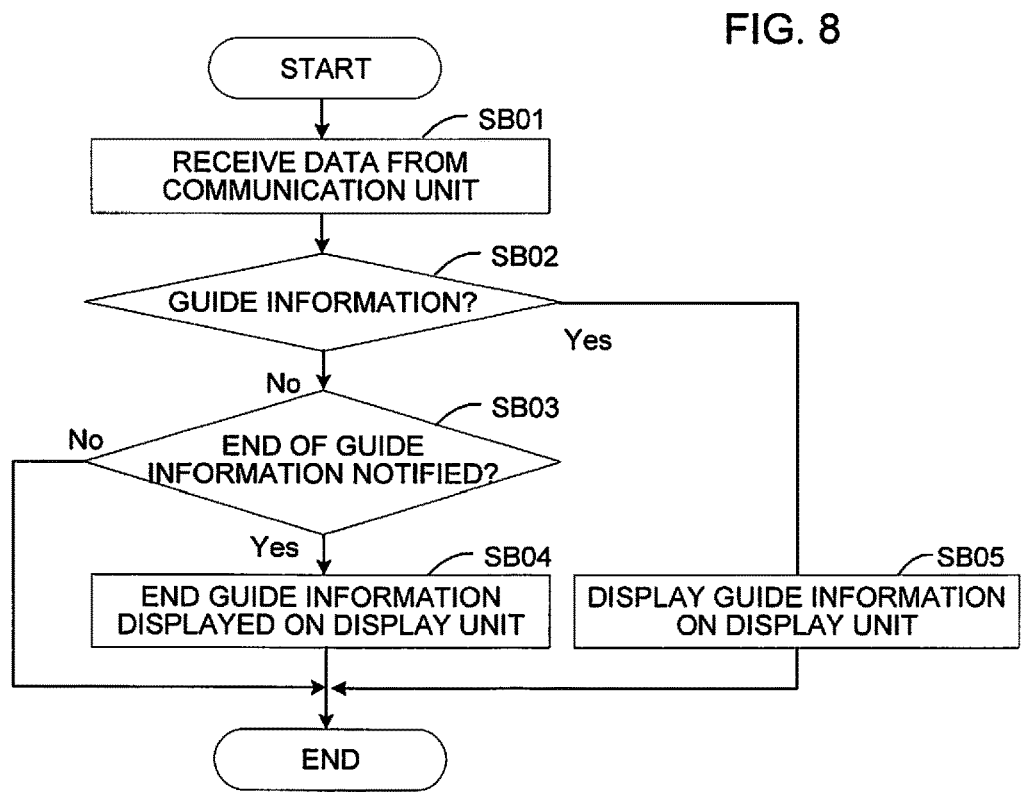
FIG. 8 is a flowchart showing the operation of a guide information analysis unit in the operation management system of FIG. 1.

FIG. 8 is a flowchart showing the operation of the guide information analysis unit 23.

(Step SB01) The guide information analysis unit 23 acquires data transmitted from the management server 10 via the communication unit 25.

(Step SB02) The guide information analysis unit 23 determines whether the data acquired in step SB01 represents guide information including an information display for guiding an operator. Processing proceeds to step SB05 when the data represents the guide information including the information display for guiding the operator, or proceeds to step SB03 when the data does not represent the guide information including the information display for guiding the operator.

(Step SB03) The guide information analysis unit 23 determines whether the operation acquired in step SB01 represents guide information including an instruction to end the display. The processing proceeds to step SB04 when the operation represents the guide information including the instruction to end the display, or the processing ends when the operation does not represent the guide information including the instruction to end the display.

(Step SB04) The guide information analysis unit 23 ends the information display for guiding the operator displayed on the display unit 21.

(Step SB05) The guide information analysis unit 23 displays the information for guiding the operator based on the guide information received in step SB01 on the display unit 21.

The embodiment of the present invention is described above. However, the present invention is not limited only to the above embodiment and may be carried out in various modes with appropriate modifications.

For example, in the above "First Example of Information Display," the information for guiding the operator is displayed only on the machine tool 20 to be used in the next work process. However, besides the sign displayed on the machine tool 20 to be used in the next work process, a sign different from the sign displayed on the machine tool 20 to be used in the next work process may also be displayed on the machine tool 20 to be used in the third working process. For example, the sign displayed on the machine tool 20 to be used in the next work process is represented by a red circle and the sign displayed on the machine tool 20 to be used in the third work process is represented by a blue circle, whereby the operator is able to see the machine tool 20 represented by the blue circle in his/her visual range while moving to the machine tool 20 represented by the red circle, such that, after the end of the work in the machine tool represented by the red circle (that is, after the transmission of the work end notification to the management server), the operator immediately checks the machine tool 20 which has been represented by the blue circle, and he/she is able to move to the machine tool 20 when the machine tool 20 is represented by the red circle. As a result, reduction in time required to look for the display unit 21 represented by the red circle may be expected. In this case, the guide information transmitted by the management server 10 needs only to include the two IDs of the machine tool 20 to be used by the operator in the next work process and the machine tool 20 to be used by the operator in the third work process.

The invention claimed is:

1. An operation management system in which a plurality of machine tools that operates based on an operation by an operator are connected to a management server via a network, wherein the management server includes
a schedule information storage unit that stores schedule information representing information on a work schedule of the operator conducting work with the machine tools,
a notification analysis unit that analyzes notifications transmitted from the machine tools,
a schedule management unit that specifies a machine tool to be used by the operator in a next work process among the plurality of machine tools based on analysis results of the notifications analyzed by the notification analysis unit and the schedule information, and
a guide information generation unit that generates guide information for guiding the operator to the machine tool specified by the schedule management unit, and transmits the generated guide information to one or more machine tools that are under the charge of the operator among the plurality of machine tools, and each of the plurality of machine tools includes
a guide information analysis unit that analyzes the guide information transmitted from the management server to generate information for guiding the operator to the machine tool to be used in the next work process,
a display unit that displays the information for guiding the operator to the machine tool to be used in the next work process, and
a notification generation unit that monitors the operation by the operator and transmits a notification representing a status of the work by the operator to the management server, wherein the guide information analysis unit is configured such that:
when an analysis result of the guide information shows that the machine tool to be used by the operator in the next work process is a machine tool embedded with the guide information analysis unit, the guide information analysis unit generates information indicating that the machine tool embedded with the guide information analysis unit is to be used by the operator in the next work process, as the information for guiding the operator to the machine tool to be used in the next work process; and
when the analysis result of the guide information shows that the machine tool to be used by the operator in the next work process is a machine tool other than the machine tool embedded with the guide information analysis unit, the guide information analysis unit generates information representing a direction of the machine tool to be used by the operator in the next work process when seen from the machine tool embedded with the guide information analysis unit, as the information for guiding the operator to the machine tool to be used in the next work process.

2. The operation management system according to claim 1, wherein
the display unit is configured so as not to display the information for guiding the operator to the machine tool to be used in the next work process when a machine tool embedded with the display unit is being used by the operator.

3. An operation management system in which a plurality of machine tools that operates based on an operation by an operator are connected to a management server via a network, wherein
the management server includes
a schedule information storage unit that stores schedule information representing information on a work schedule of the operator conducting work with the machine tools,
a notification analysis unit that analyzes notifications transmitted from the machine tools,
a schedule management unit that specifies a machine tool to be used by the operator in a next work process among the plurality of machine tools based on analysis results of the notifications analyzed by the notification analysis unit and the schedule information, and
a guide information generation unit that generates guide information for guiding the operator to the machine tool specified by the schedule management unit, and transmits the generated guide information to one or more machine tools that are under the charge of the operator among the plurality of machine tools, and
each of the plurality of machine tools includes
a guide information analysis unit that analyzes the guide information transmitted from the management server to generate information for guiding the operator to the machine tool to be used in the next work process,
a display unit that displays the information for guiding the operator to the machine tool to be used in the next work process, and
a notification generation unit that monitors the operation by the operator and transmits a notification representing a status of the work by the operator to the management server, wherein
the guide information analysis unit is configured such that:
when an analysis result of the guide information shows that the machine tool to be used by the operator in the next work process is a machine tool embedded with the guide information analysis unit, the guide information analysis unit generates information indicating that the machine tool embedded with the guide information analysis unit is to be used by the operator in the next work process, as the information for guiding the operator to the machine tool to be used in the next work process; and
when the analysis result of the guide information shows that the machine tool to be used by the operator in the next work process is a machine tool other than the machine tool embedded with the guide information analysis unit, the guide information analysis unit generates an instruction to switch off the display unit or reduce brightness of the display unit as the information for guiding the operator to the machine tool to be used in the next work process.

4. An operation management system in which a plurality of machine tools that operates based on an operation by an operator are connected to a management server via a network, wherein
the management server includes
a schedule information storage unit that stores schedule information representing information on a work schedule of the operator conducting work with the machine tools,
a notification analysis unit that analyzes notifications transmitted from the machine tools,
a schedule management unit that specifies a machine tool to be used by the operator in a next work process among the plurality of machine tools based on analysis results of the notifications analyzed by the notification analysis unit and the schedule information, and
a guide information generation unit that generates guide information for guiding the operator to the machine tool specified by the schedule management unit, and transmits the generated guide information to one or more machine tools that are under the charge of the operator among the plurality of machine tools, and
each of the plurality of machine tools includes
a guide information analysis unit that analyzes the guide information transmitted from the management server to generate information for guiding the operator to the machine tool to be used in the next work process,
a display unit that displays the information for guiding the operator to the machine tool to be used in the next work process, and
a notification generation unit that monitors the operation by the operator and transmits a notification representing a status of the work by the operator to the management server, wherein
the display unit is configured so as not to display the information for guiding the operator to the machine tool to be used in the next work process when a machine tool embedded with the display unit is being used by the operator.

* * * * *